UNITED STATES PATENT OFFICE.

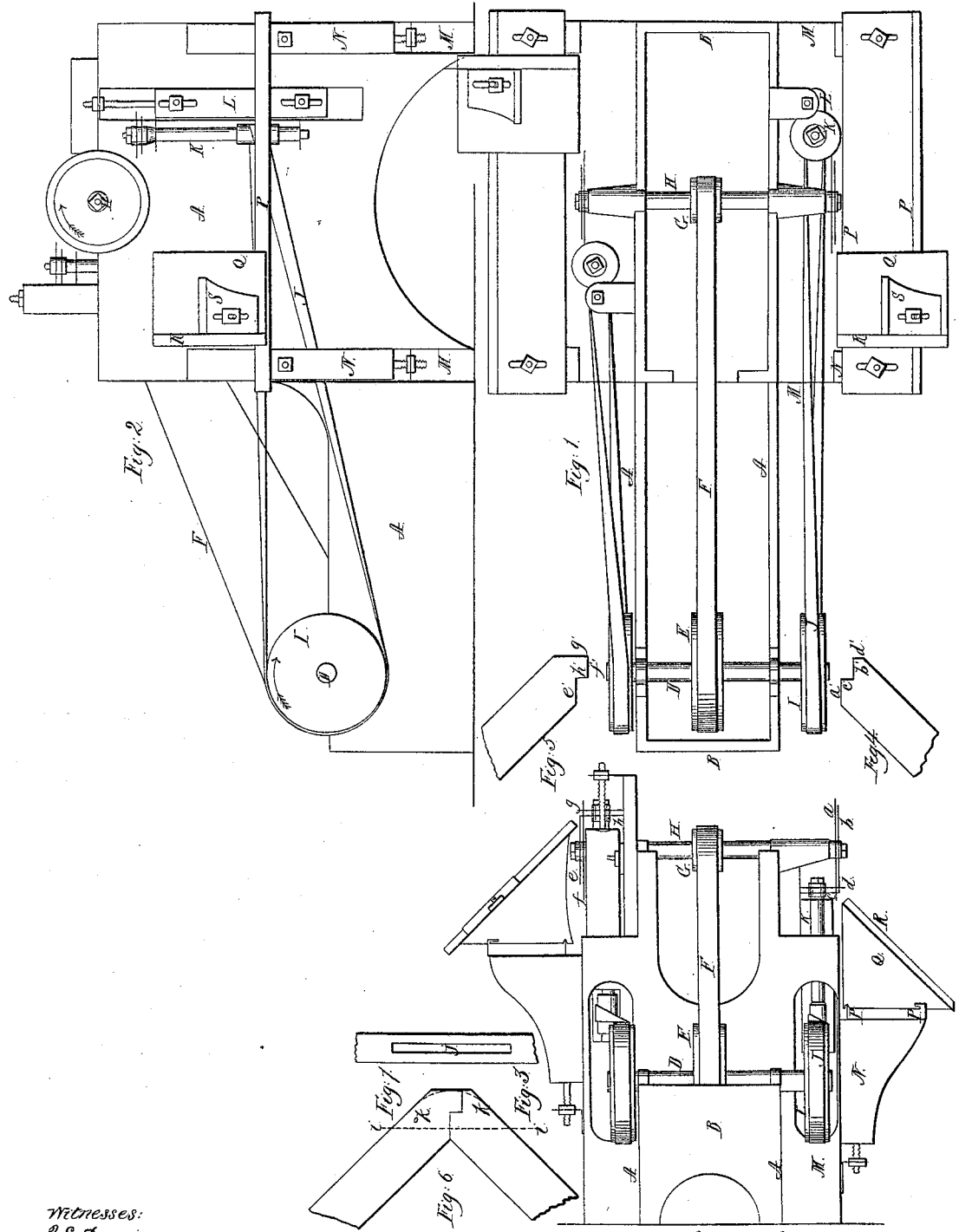
F. Shenton,
Mitering Machine,
№ 42,695. Patented May 10, 1864.

FRANCIS SHENTON, OF SLATINGTON, PENNSYLVANIA.

IMPROVEMENT IN MACHINES FOR MAKING SLATE AND OTHER FRAMES.

Specification forming part of Letters Patent No. 42,695, dated May 10, 1864.

*To all whom it may concern:*

Be it known that I, FRANCIS SHENTON, of Slatington, in the county of Lehigh and State of Pennsylvania, have invented a new and useful Machine for Cutting the Joints of Slate and other Frames; and I do hereby declare that the same is described and represented in the following specifications and drawings.

To enable others skilled in the art to make and use my invention, I will proceed to describe its construction and the mode of using it, referring to the drawings, in which the same letters indicate like parts in each of the figures.

Figure 1 is a plan or top view of my machine. Fig. 2 is a side elevation, and Fig. 3 an end elevation.

The nature of my invention consists in the combination and arrangement of horizontal and perpendicular saws with traversing carriages operated, as will be hereinafter described, to make the joints of slate and other frames.

In the accompanying drawings, A A are the sides of the frame connected by the ends B B, and center piece, C, making a strong frame, to which the other parts are fastened or connected, as shown in the drawings. This from may be made in the form shown, or in such other form as will answer the purpose. I fasten some boxes to the sides A, for the shaft D to turn in, which shaft may be provided with a fast and loose pulley for a band from some moving power to operate the machine. The pulley E is fastened to the shaft D, and carries the belt F, which drives the pulley G and shaft H, which shaft turns in boxes fastened to the sides A, as shown in Fig. 1. This shaft H carries two large and two smaller saws, fastened on its end by collars and screw-nuts, as shown in the drawings.

The pulley I is fastened to the shaft D, and carries the band J to drive the perpendicular shaft K, arranged to turn in boxes on the frame L, fastened to a flange on the side A, which frame L is provided with slots and screw-bolts to adjust it higher or lower and adapt the saws on the upper end of the shaft K to their work.

The flanges M M are fastened to the side A to hold the adjustable brackets N N, which support the ways P P for the carriage Q to traverse on, and carry the parts of the frame to be cut to the saws heretofore mentioned.

The carriage Q is made in the form represented, and provided with a cleat, R, against which cleat the piece of frame to be cut or sawed is placed and held by the workman, while he traverses the carriage under the saws.

The adjustable bracket S is fastened to the carriage Q to hold the ends of the pieces of frame while they are cut and govern the length to make the frames the desired size.

Part of a frame cut by the saws on this side of the machine is shown in Fig. 4, the saw $a$ cutting the part $a'$, and the saw $b$ the part $b'$, the saw $c$ part $c'$, and the saw $d$ the part $d'$ of the end of the piece, Fig. 4. The pulley, perpendicular shaft, frame, stands, ways, and carriage, which I have described on this side of the machine, are duplicated on the opposite side, as shown in the drawings, and arranged to cut a joint, as shown in Fig. 5, to fit the piece shown in Fig. 4—that is, the saw $e$ cuts the part $e'$, the saw $f$ the part $f'$, the saw $g$ the part $g'$, and the saw $h$ the part $h'$ of the joint.

When the pieces shown in Figs. 4 and 5 are put together, as shown in Fig. 6, and a groove made across the corner down to the dotted line $i\ i$, and a spline, $j$, put in, as shown in Fig. 7, and fastened by the pins $k\ k$, making a firm, strong joint when glued together, and it may be finished by rounding it off by a saw or otherwise, as shown by the curved dotted line in Fig. 6.

I contemplate that additional saw or saws may be applied to the horizontal and perpendicular shaft, so as to cut joints with more notches, if desired.

Having thus described my invention, what I claim as new, and desire to secure by Letters Patent, is—

The arrangement of the saws on the adjustable upright shafts, the saws on the horizontal shaft, with the adjustable and sliding carriages, when constructed as described, and for the purposes set forth.

FRANCIS SHENTON.

Witnesses:
FRANCIS KUNTZ,
HENRY KUNTZ.